A. VON DER CRONE.
SELF CLOSING FUNNEL.
APPLICATION FILED NOV. 23, 1912.
1,061,888.
Patented May 13, 1913.
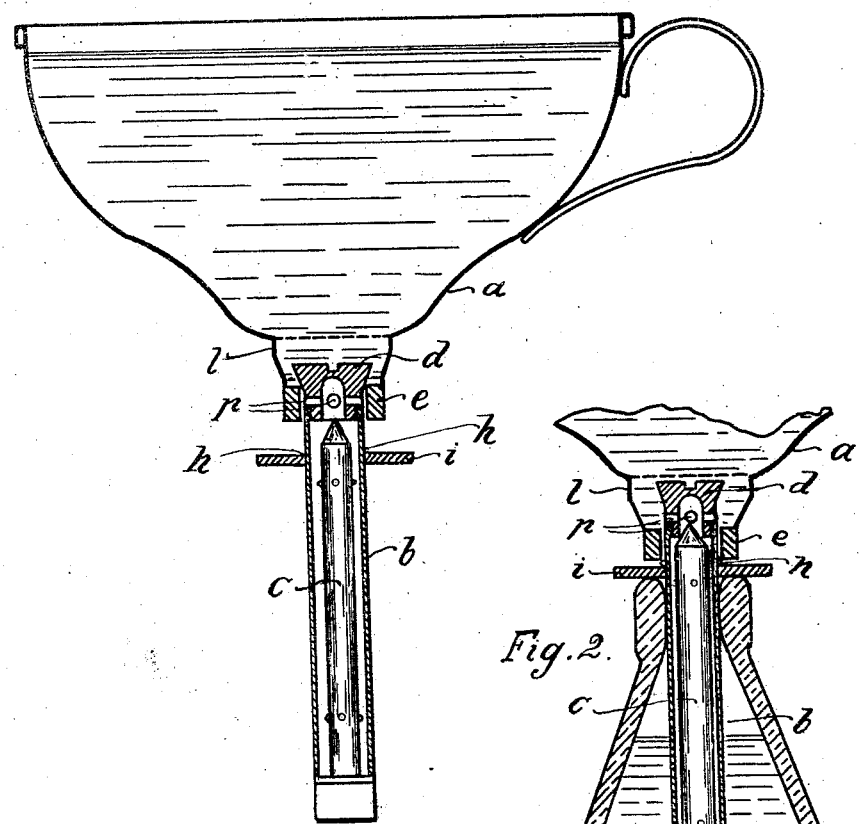
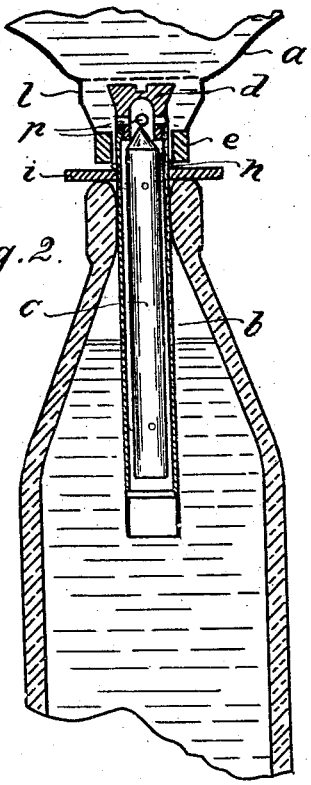

UNITED STATES PATENT OFFICE.

AUGUST VON DER CRONE, OF BERLIN, GERMANY.

SELF-CLOSING FUNNEL.

1,061,888.  Specification of Letters Patent.  Patented May 13, 1913.

Application filed November 23, 1912. Serial No. 733,106.

*To all whom it may concern:*

Be it known that I, AUGUST VON DER CRONE, a subject of the King of Prussia, residing at Berlin, in the Kingdom of Prussia, in the German Empire, (whose post-office address is 23 Gerichtstrasse,) merchant, have invented certain new and useful Improvements in Self-Closing Funnels; and I do hereby declare the following to be a full, clear, and exact description of the invention, such as will enable others skilled in the art to which it appertains to make and use the same.

The present invention relates to a self-closing funnel, in which the opening through which the liquid flows remains closed so long as the funnel is held in the hand and until it is set into the neck of the bottle. When the funnel is introduced into the neck of the bottle, the opening is freed and it closes again automatically as soon as the bottle is filled. Funnels that act in that way are already known.

In the present invention, however, the arrangement of the funnel is very much simplified indeed, and particularly the arrangement of those parts that produce the action above described.

The funnel according to the present invention is so arranged that it has only a single filling tube, formed at the upper end as a multiple valve. The valve closes the passage as soon as the funnel is taken in the hand, but it opens the passage by the displacement of the little tube whenever the funnel is set on the neck of the bottle, the connection between the filling cup and the filling tube arranged to move inside it closing at the same time. Further a valve seat is provided on the filling tube and it is closed by a light float that is forced upward as the liquid rises in the bottle.

In order that my invention may be properly understood and readily carried into effect, I have hereunto appended one sheet of drawings, of which—

Figure 1 is a longitudinal section through the self closing funnel. Fig. 2 is a section of the same showing it applied to a bottle.

The funnel, as shown in the accompanying drawing, consists of a filling cup $a$ and the filling tube $b$ that is fitted so that it will move in the lower narrow part or spout $l$ of the funnel. The tube is guided by a cylindrical ring $e$. The upper end of the tube is formed as a valve $d$, with openings $p$ for the passage of the liquid. When the valve is raised, those openings are freed as shown in Fig. 2, and on the contrary when the valve is down the liquid is cut off.

The position of the apparatus shown in Fig. 1 is the position when the funnel is held in the hand. If, however, the funnel be set into a bottle, a disk $i$ attached to the filling tube $b$ comes into contact with the rim of the neck of the bottle and the cup of the funnel $a$ sinks down so as to open the orifices $p$ of the valve $d$. At the same time a packing or collar $h$, which acts as a valve, forms a tight closure at the lower part of the filling cup $a$. Below the passages $p$ of the valve $d$ there is provided a valve seat, and inside the filling tube $b$ there is a float valve $c$, the upper tapered end of which causes the valve to close when the liquid as it rises in the bottle forces the float upward. The valve $d$ has a screw thread on it and it can be taken out so as to facilitate the removal and replacement of the filling tube. In that way the cleaning of the funnel or the replacement of any of its parts, is rendered easy.

The funnel is distinguished by great simplicity, as it has only a single filling tube, which is movable in the lower part of the filling cup, that tube itself being formed as a multiple valve. This very simple arrangement not only makes it easier to manufacture the funnel, but also gives great surety and safety in working.

Having now particularly described and ascertained the nature of my said invention and in what manner the same is to be performed, I declare that what I claim is:—

A funnel comprising a vessel having a spout providing a valve seat; a tube adapted to enter the vessel to be filled; a hollow head connected to and closing the end of the tube within the spout, said head providing, respectively, a valve for the valve seat of the spout, and a valve seat within the tube; and a portion of the head within the spout provided with fluid passageways closed when the valve is seated; means carried by the tube adapted to engage with the vessel to be filled for moving the tube to unseat the valve of the head and open said fluid passageways into the vessel; and a float located within the tube and operable to seat against the valve seat of the head and automatically close said passageways when said float is lifted by the liquid in the vessel being filled.

In testimony whereof, I have affixed my signature in presence of two witnesses.

AUGUST von der CRONE.

Witnesses:
 Henry Hasper,
 Woldemar Haupt.

Copies of this patent may be obtained for five cents each, by addressing the "Commissioner of Patents, Washington, D. C."